(12) United States Patent
Jo (10) Patent No.: US 11,932,149 B2
(45) Date of Patent: Mar. 19, 2024

(54) FOREIGN MATTER BLOCKING DEVICE OF VEHICLE SEAT RAIL AND ASSEMBLING METHOD THEREOF

(71) Applicant: DAS Co., Ltd., Gyeongsangbuk-do (KR)

(72) Inventor: In Ho Jo, Gyeonggi-do (KR)

(73) Assignee: DAS CO., LTD., Gyeongsangbuk-do (KR)

( * ) Notice: Subject to any disclaimer, the term of this patent is extended or adjusted under 35 U.S.C. 154(b) by 588 days.

(21) Appl. No.: 17/150,716

(22) Filed: Jan. 15, 2021

(65) Prior Publication Data
US 2022/0161703 A1    May 26, 2022

(30) Foreign Application Priority Data
Nov. 20, 2020    (KR) .................. 10-2020-0156670

(51) Int. Cl.
*B60N 2/90*    (2018.01)
*B62D 65/14*    (2006.01)
*B60N 2/07*    (2006.01)

(52) U.S. Cl.
CPC .............. *B60N 2/90* (2018.02); *B62D 65/14* (2013.01); *B60N 2/0702* (2013.01); *B60N 2/0722* (2013.01); *B60N 2/0725* (2013.01)

(58) Field of Classification Search
CPC ...... B60N 2/90; B60N 2/0725; B60N 2/0722; B60N 2/0702; B62D 65/14
USPC .......................................................... 296/63
See application file for complete search history.

(56) References Cited

U.S. PATENT DOCUMENTS

| 9,248,911 B2 * | 2/2016 | Köhn ................... B60N 2/0725 |
| 9,399,413 B2 * | 7/2016 | Phinney ............... B60N 2/0725 |
| 2001/0006209 A1 | 5/2001 | Yoshida |
| 2011/0233365 A1 | 9/2011 | Kato |
| 2020/0198502 A1 | 6/2020 | Jeong |

FOREIGN PATENT DOCUMENTS

| DE | 102017209452 A1 * | 12/2018 |
| DE | 102017209452 A1 | 12/2018 |
| KR | 1019970036425 | 7/1997 |
| KR | 2010120768 A * | 11/2010 .............. B60N 2/07 |
| KR | 20100120768 A | 11/2010 |

OTHER PUBLICATIONS

Office Action issued in connection with Indian Patent Application No. 202144002182 dated Jun. 1, 2022.
First Chinese Office Action, for corresponding CN Application No. 202110063656.8, dated Apr. 6, 2023, pp. 1-6.

* cited by examiner

*Primary Examiner* — Amy R Weisberg
*Assistant Examiner* — Dana D Ivey
(74) *Attorney, Agent, or Firm* — TAROLLI, SUNDHEIM, COVELL & TUMMINO L.L.P.

(57) ABSTRACT

The present invention relates to a device of a vehicle sear rail for blocking foreign matter and a method for assembling the same. A side part inserted into a guide groove is formed at both ends of a front end member of a moving blade, and a discharge hole is formed in a housing of the moving blade module. The foreign matter flowing into the guide groove can be pushed out through the discharge hole, and thus, the deterioration in operating performance and in operating sensitivity due to the foreign matter entering the seat rail can be prevented.

4 Claims, 10 Drawing Sheets

FOREIGN MATTER BLOCKING DEVICE OF VEHICLE SEAT RAIL AND ASSEMBLING METHOD THEREOF

RELATED APPLICATIONS

The present invention is a Nonprovisional Application under 35 USC 111(a), claiming priority to Serial No. KR 10-2020-0156670, filed on 20 Nov. 2020, the entirety of which is incorporated herein by reference.

TECHNICAL FIELD

The present invention relates to a vehicle seat rail, and more particularly, to a device of a vehicle seat rail for blocking foreign matter and assembly method thereof that is capable of preventing foreign matter from flowing into the lower rail through an opening hole formed on the upper surface of the lower rail.

BACKGROUND OF THE INVENTION

Vehicle seats are mounted on a floor via seat rails (slide rails) to adjust the position in the front and rear directions. Seat rails are provided to the driver seat and passenger seat of the vehicle, and, in the case of SUV or van type vehicles, to the second row seat, so that the seat can be moved back and forth.

A seat rail is structured by coupling a lower rail fixed to a floor with an upper rail fixed to a seat. The upper rail is assembled to be slidable with respect to the lower rail through a rolling contact member such as a ball or roller.

Figure 1:
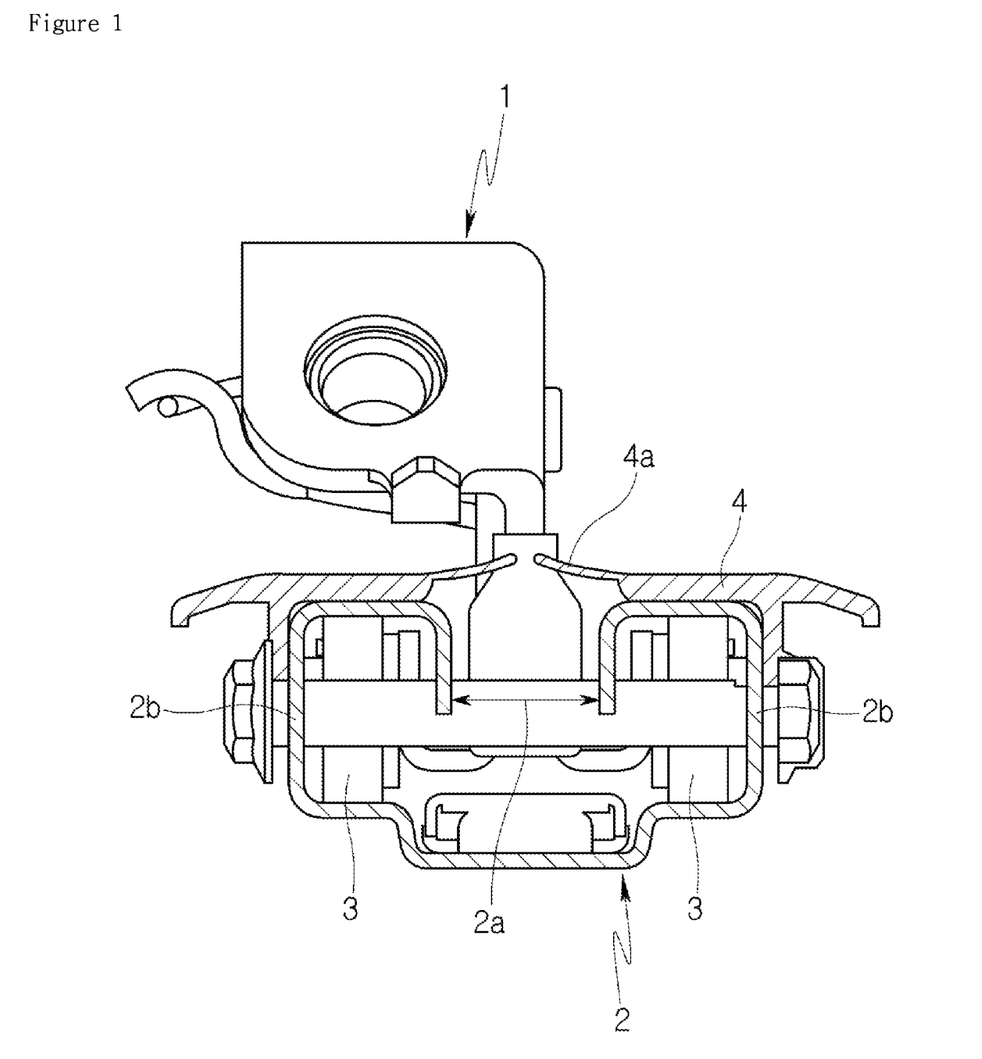
FIG. 1 is a front cross sectional view of a vehicle seat rail to which a conventional foreign matter blocking structure is applied.

FIG. 1 illustrates a cross sectional view of the seat rail. An upper rail 1 is inserted into a lower rail 2 through an opening hole 2a formed on the upper part of the lower rail 2, and a roller 3 is provided on both sides of the inserted part. The lower rail 2 has a roller moving part 2b surrounding both rollers 3 by extending both ends of the bottom part, and the opening hole 2a is formed between both roller moving parts 2b.

As the roller 3 rolls along the roller moving part 2b in the longitudinal direction of the lower rail 2, the upper rail 1 can move in the front and rear directions of a vehicle so that the seat position can be adjusted.

Meanwhile, since the opening hole 2a is formed over the entire length direction of the lower rail 2 and is opened upward, foreign matter or foreign substance such as dust is easily introduced. The foreign matter introduced through the opening hole 2a interferes with the rotation of the roller 3 by interfering with the rotation axis gap of the roller 3 or interfering between the roller 3 and the bottom surface of the roller moving part 2b thereby disturbing the operation of the seat rail, deteriorating operational sensibility, and in severe cases, generating noise.

Therefore, conventionally, by mounting the rail cover 4 made of rubber material on the upper part of the lower rail 2 the inflow of the foreign matter is prevented. A wing part 4a of a thin thickness is formed at both inner ends of the rail cover 4, and the wing part 4a has a length overlapping the inserted part of the upper rail 1.

Therefore, the inflow of foreign matter can be prevented while the upper rail 1 is moved, However, since the wing part 4a is configured to overlap with the inserted part of the upper rail 1, the deformation of the wing part 4a can be occurred as the usage time increased, and such deformation deteriorates the appearance quality of the seat rail installation part. In addition, there is still a problem in that foreign matter is introduced into the interior of the seat rail through the gap.

RELATED LITERATURE

Patent Document

KR Patent laid-open publication no. 1997-0036425 (1997 Jul. 22)

SUMMARY OF INVENTION

Problems to be Solved

The present invention is conceived to solve the above problems, and the present invention provides a device of a vehicle seat rail for blocking foreign matter which is capable of keeping the opening hole of an upper rail in a blocked state while allowing the seat to move back and forth.

The present invention further provides an assembly method for easily installing a device of a vehicle seat rail for blocking foreign matter on a vehicle floor.

Means to Solve the Problem

According to another aspect of the present invention, a method for assembling a device of vehicle seat rail for blocking foreign matter may include a seat rail mounting step for fixing a lower rail of a seat rail to a floor of a vehicle with a screw; a seat mounting step for mounting a seat on an upper rail of the seat rail which is mounted on the floor in the seat rail mounting step; a left and right rail synchronizing step, after the seat mounting step, for moving the left and right upper rails as far as possible forward and backward to match the positions of the left and right upper rails; and an upper rail and moving blade connecting step that if the upper rail moves to the end of the lower rail during the left and right rail synchronizing step, a connection member of the upper rail meets a front end member of a moving blade, and a first locking jaw of the connection member is inserted and caught in a connection hole of the front end member, whereby the connection member and the front end member are automatically connected to each other.

The moving blade module may further include a drum which is located in a cylindrical housing and rotates by a spiral spring, one end of the moving blade being connected to the drum and being wound around the drum, and the other end of the moving blade drawn out of the housing having a front end member, the front end member having a connection hole. A connection member may have a first locking jaw provided at the front and rear ends of the upper rail. The moving blade may be connected to the upper rail by inserting the first locking jaw of the connection member into the connection hole of the front end member and being hooked.

The lower rail may further include a guide groove formed on both sides of the opening hole in the width direction, and the diameter of the guide groove may be gradually narrower as the distance from the opening hole increases.

A side part having the same cross sectional shape as the guide groove may be formed at both ends of the front end member in the width direction, and the side part may be inserted into the guide groove to push and move foreign matter inside the guide groove when moving back and forth.

A discharge hole may be formed in the housing of the moving blade module, and the foreign matter inside the guide groove pushed and moved by the side part of the front end member may be discharged to an outside of the seat rail through the discharge hole.

An end cover may be provided at both ends of the lower rail to cover the moving blade module, and the end cover may be integrally formed with the housing of the moving blade module.

An end cover may be provided at both ends of the lower rail to cover the moving blade module, and the end cover may be manufactured as a separate element from the moving blade module and mounted on an upper surface of the housing of the moving blade module.

According to another aspect of the present invention, a method for assembling a device of vehicle seat rail for blocking foreign matter may include a seat rail mounting step for fixing a lower rail of a seat rail to a floor of a vehicle with a screw; a seat mounting step for mounting a sheet on an upper rail of the seat rail which is mounted on the floor in the seat rail mounting step; a left and right rail synchronizing step, after the seat mounting step, for moving the left and right upper rails as far as possible forward and backward to match the positions of the left and right upper rails; and an upper rail and moving blade connecting step that if the upper rail moves to the end of the lower rail during the left and right rail synchronizing step, a connection member of the upper rail meets a front end member of a moving blade, and a first locking jaw of the connection member is inserted and caught in a connection hole of the front end member, whereby the connection member and the front end member are automatically connected to each other.

Effect of the Invention

According to the present invention as described above, since the opening hole is always blocked by the moving blade even while the upper rail moves back and forth along the lower rail, it is possible to prevent foreign matter from entering through the opening hole. Therefore, it is possible to prevent the deterioration of operation performance, the deterioration of operation sensibility and the generation of noise, due to foreign matters.

In addition, a foreign matter discharge hole is formed in the housing of the moving blade module, and the front end member of the moving blade pushes the foreign matter introduced into the guide groove of the upper rail toward the discharge hole, thereby discharging the foreign matter flowed into the guide groove from the upper surface of the moving blade.

In addition, by assembling in the manner described above, it can solve the problem that can be occurred during the seat rail mounting due to the connection of the moving blade and the upper rail.

DETAILED DESCRIPTION OF THE EMBODIMENTS

In the present invention, various modifications may be made and various embodiments may be provided, and certain embodiments will be illustrated in the drawings and described in detail. However, this is not intended to limit the present invention to a specific embodiment, it is to be understood to include all changes, equivalents, and substitutes included in the spirit and scope of the present invention. The thickness of the lines or the size of components shown in the accompanying drawings may be exaggerated for clarity and convenience of description.

In addition, the terms to be described later are terms defined in consideration of functions in the present invention and may vary according to the intentions or precedents of users and operators. Therefore, the definitions of these terms should be made based on the contents throughout the present specification.

Hereinafter, preferred embodiments of the present invention will be described in detail with reference to the accompanying drawings.

Figure 2:
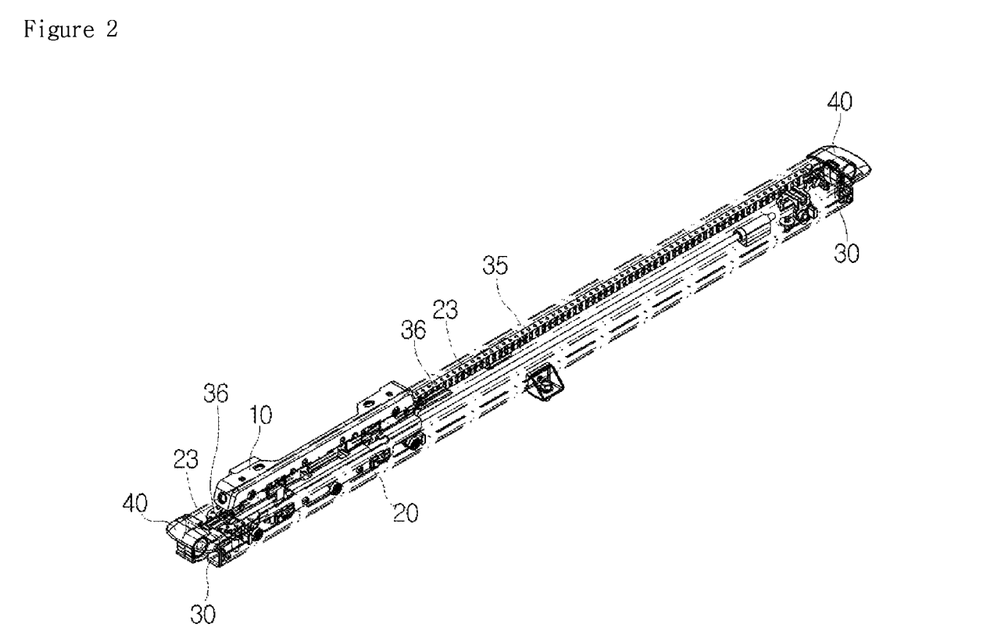
FIG. 2 is a perspective view of a vehicle seat rail to which a device for blocking foreign matter is applied, according to the present invention.
Figure 3:
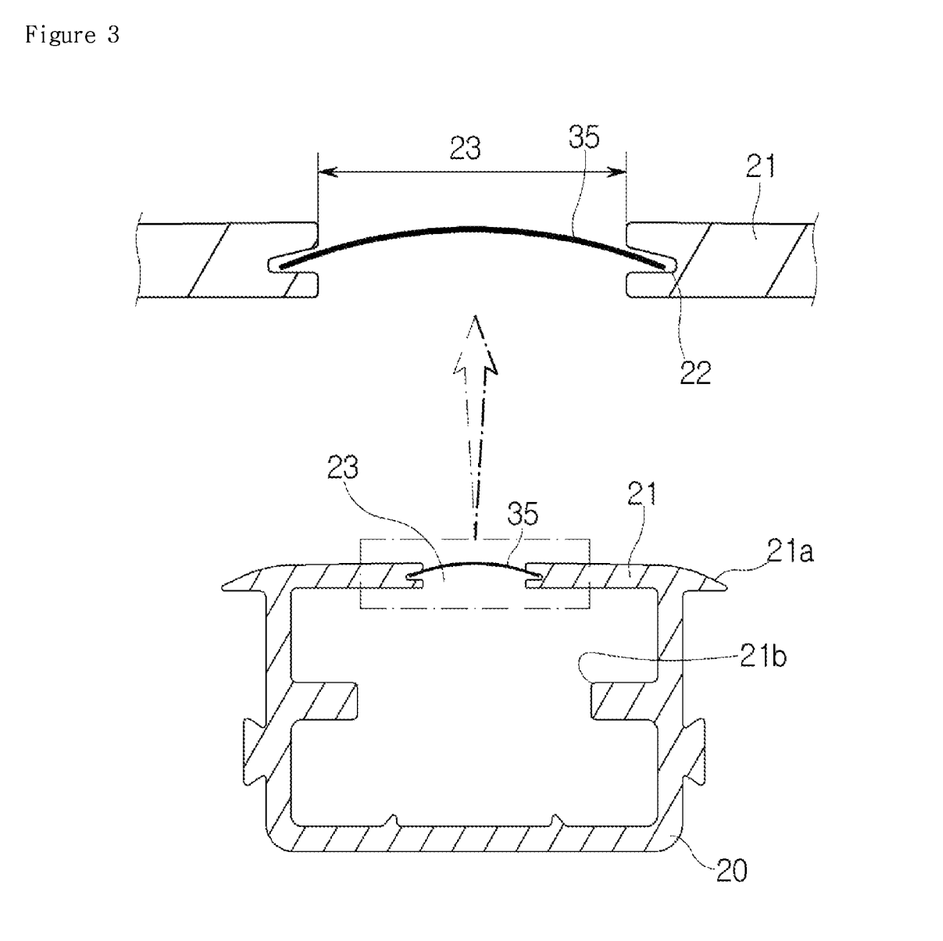
FIG. 3 is a cross sectional view of a lower rail and an enlarged view of its main parts (a cross sectional view of a moving blade in an installation state) according to the present invention.
Figure 4:
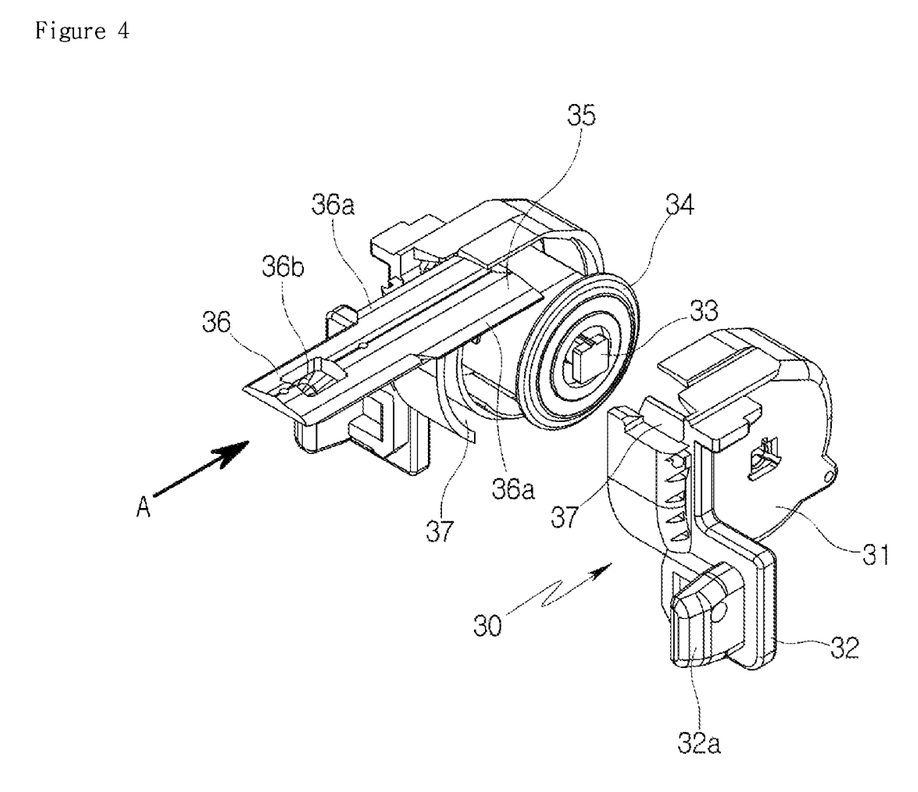
FIG. 4 is a perspective view of the moving blade module (one part of the housing in a separated state).

As shown in FIGS. 2 to 4, the device of a vehicle seat rail for blocking foreign matter according to the present invention may include an upper rail 10, a lower rail 20 and a moving blade module 30.

On the upper part of the upper rail 10, a cushion frame of the seat may be mounted, and a plurality of rollers may be installed on both front and rear sides of the lower part inserted into the interior of the lower rail 20 and roll and move along the length direction of the lower rail 20.

The lower rail 20 may be a long tubular body having a substantially rectangular cross section, and at both ends of an upper surface part 21, an inclined protrusion 21a may be formed so as to be in close contact with the surface of a floor without a step. In addition, a rib 21b may be formed to protrude as a whole along the longitudinal direction on both inner walls of the lower rail 20. The rib 21b may increase the rigidity of the lower rail 20, and form a space under its lower part in which the roller of the upper rail 10 is accommodated and moved and act as a stopper to block the upward movement of the roller.

An opening hole 23 may be formed on the center of the upper surface part 21 of the lower rail 20 over the entire length direction of the lower rail 20. As the opening hole 23 is formed in this way, the upper rail 10 can be moved in the front and rear directions in a state assembled to the lower rail 20.

A guide groove 22 may be formed on both side surfaces (both wall surfaces) of the opening hole 23 in the width direction, for example, the inner end of the upper surface part 21 throughout the length direction of the lower rail 20. The both ends of the moving blade 35 of the moving blade module 30 and the front end member 36 in the width direction, which will be described later, are inserted into the guide groove 22 to guide their forward and backward movement paths.

Particularly, the guide groove 22 may be formed along the lengthwise direction on both side walls of the opening hole 23, and the diameter of the guide groove 22 may gradually decrease as the distance from the opening hole 23 increases. For example, the lower side 22a of the guide groove 22 may be formed in the form of a surface parallel to a ground or a floor, and the upper side 22b of the guide groove 22 may be shaped into a surface formed inclined at a predetermined angle with a ground.

With this configuration, even if the moving blade 35 to be described later has an arch shape protruding upward, it can be accommodated into the guide groove 22. Thus, even if dust F is accumulated on both sides along the surface of the moving blade 35, dust F can be blocked to enter into the lower rail 20.

The moving blade module 30 may be installed at both ends of the lower rail 20 in the longitudinal direction and be a device for winding the moving blade 35.

The moving blade module 30 may be configured to have a mounting part 32 which has a substantially rectangular plate-shape and is formed on one side of the cylindrical housing 31, and an insertion end 32a may be protruded from both front sides of the mounting part 32. Since the insertion end 32a is inserted into the end of the lower rail 20, the moving blade module 30 may be mounted on the end of the lower rail 20. The opening at the end of the lower rail 20 may become a mounting hole for the moving blade module 30.

A fixed shaft 33 may be installed in the center of the housing 31, a drum 34 may be installed on the fixed shaft 33 via a spiral spring (not shown). The moving blade 35 may be wound on the outer periphery of the drum 34. The spiral spring always rotates the drum 34 in a direction in which the moving blade 35 is wound around the drum 34.

When the upper rail 10 is completely moved to one end of the lower rail 20, the moving blade 35 may have a length that can entirely cover the opening hole 23 opened upward from the upper rail 10 to the other end of the lower rail 20. This is the same in the moving blade module 30 installed at both front and rear ends of the lower rail 20.

The moving blade 35 may be formed in a plate shape having a curved surface. As an example, the moving blade 35 may be a plate bent in an arch shape protruding upward.

The shortest distance between both ends of the moving blade 35 in the width direction may be wider than the width of the opening hole 23 and have a length equal to or slightly shorter than the distance between inner ends of the both guide grooves 22.

With this configuration, the moving blade 35 can reduce friction with the lower rail 20 when moving in the front and rear directions. Further, even if an impact is applied in the vertical direction, the elastic deformation can be occurred and the impact can be dispersed.

The moving blade 35 may be installed in a state in which both ends in the width direction are inserted into both guide grooves 22 formed in the upper surface part 21 of the lower rail 20. Accordingly, the opening hole 23 may be completely blocked in the vertical direction by the moving blade 35.

One end of the moving blade 35 in the longitudinal direction may be fixed to the outer peripheral surface of the drum 34, and on the other end of the moving blade 35 a front end member 36 may be provided.

The front end member 36 may be installed at the front end of the moving blade 35 and be integrally connected to the moving blade 35. They may be connected by overlapping the moving blade 35 on the upper surface of the rear end of the front end member 36 (using a through-type fastening means such as attachment, fusion, screw, etc.), or by forming at the rear end of the front end member 36 an insertion groove to which the moving blade 35 is inserted and inserting the moving blade 35 into the insertion groove (using a through-type fastening means such as attachment, fusion, screw, etc.).

Figure 5:
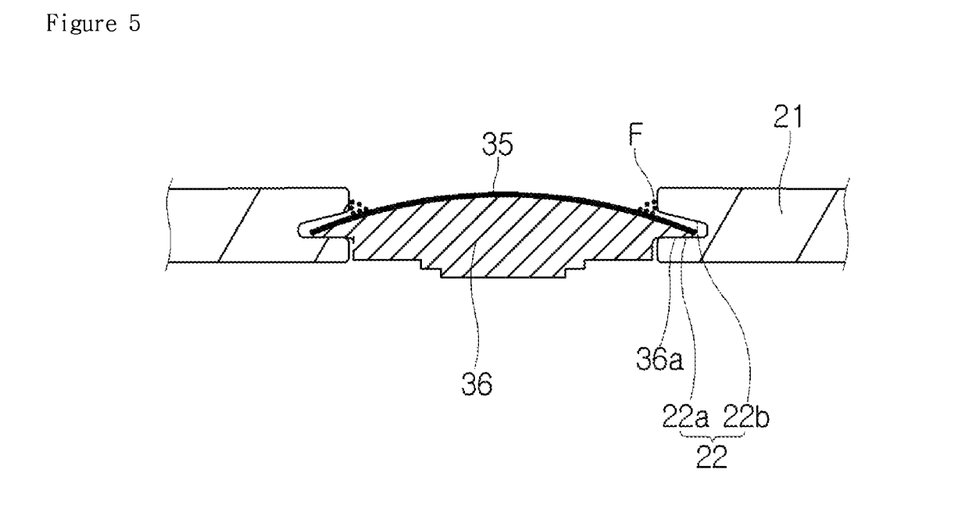
FIG. 5 is a cross sectional view illustrating an installation state of a front end member provided at an end of the moving blade.

A side part 36a having the same cross sectional shape as the cross sectional shape of the guide groove 22 may be formed at both ends of the front end member 36 in the width direction. The side part 36a may be inserted into the guide groove 22 of the lower rail 20 as shown in FIG. 5. The size (area) of the side part 36a may be slightly smaller than the guide groove 22, and thus, it can move along the length direction of the guide groove 22 without difficulty.

A connection hole 36b of a rectangular shape may be formed through the front part of the front end member 36. This connection hole 36b may be used to connect the front end member 36 to the connection member 11 (see FIG. 9(d)) provided in the upper rail 10.

The front part of the front end member 36 in which the connection hole 36b is formed may have a width equal to or slightly smaller than the opening hole 23 of the lower rail 20. Therefore, while the front end member 36 blocks the opening hole 23 in the vertical direction, it is not difficult to move back and forth along the length direction of the lower rail 20.

The front end member 36 can be configured such that the both ends of the rear part, that is, the side part 36a is protruded outward the both ends of the front part, when viewed from the front (in the direction of arrow A in FIG. 4), due to the difference in length in the width direction of the front part and the rear part of the front end member 36 as described above.

Figure 6:
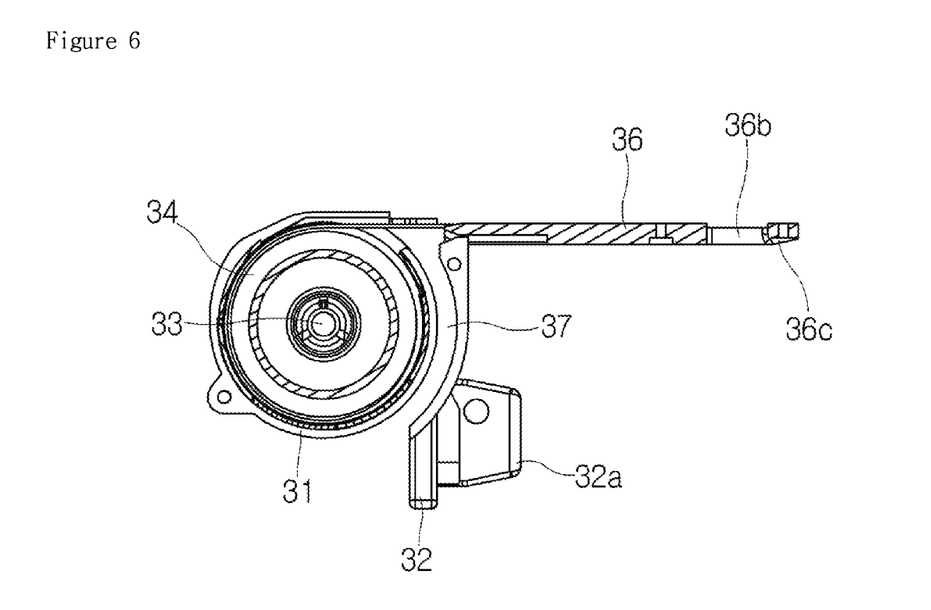
FIG. 6 is a side cross sectional view of the moving blade module.
Figure 7:
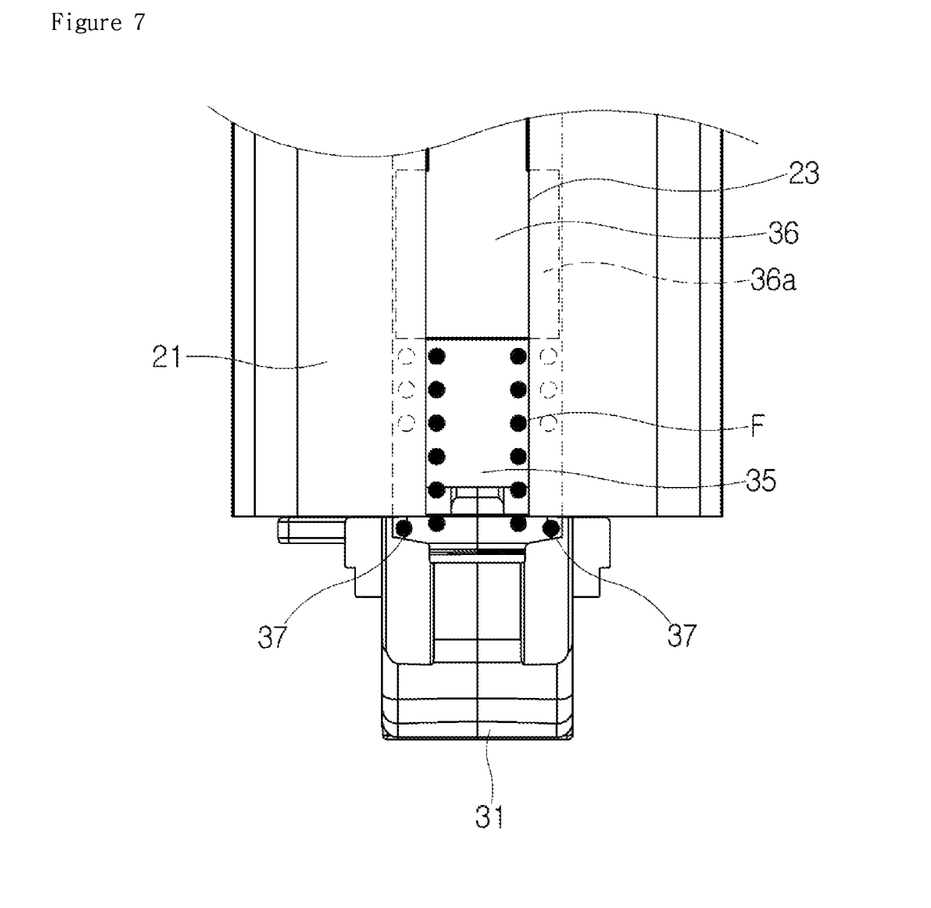
FIG. 7 is a plan view of the moving blade module.

As shown in FIGS. 6 and 7, a discharge hole 37 may be formed through the housing 31 corresponding to lower rail 20 in vertical direction. The discharge hole 37 may be formed in a curved shape having the same curvature as the cylindrical shape of the housing 31 so as not to invade the winding space of the drum 34 and the moving blade 35 inside the housing 31. The upper end of the discharge hole 37 may be disposed at a location where the end of the lower rail 20 ends, and the width is the same as the distance between the ends of the guide grooves 22 on both sides of the lower rail 20.

As shown in FIG. 2, an end cover 40 may be installed at both front and rear ends of the lower rail 20 to cover the moving blade module 30 from being exposed to an outside.

The end cover 40 may be integrally formed on the upper part of the housing 31 and may be formed as a part of the moving blade module 30.

Figure 8A:
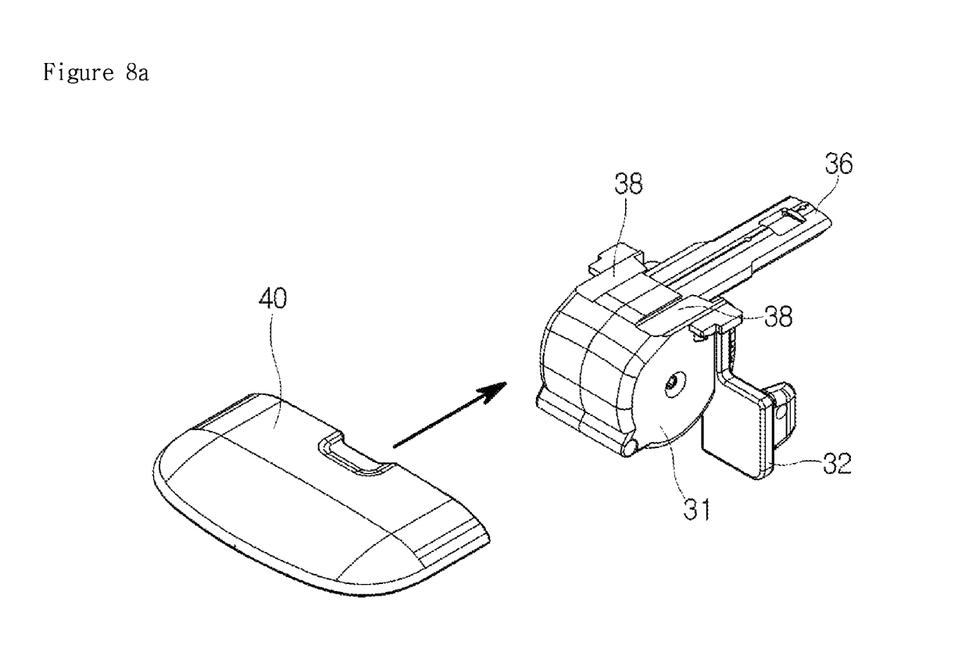
FIG. 8(a) is an exploded perspective view of the moving blade module and the end cover, and (b) is a perspective view showing the end cover upside down.

In addition, the end cover 40 may be an externally designed element. As shown in FIG. 8, the end cover 40 may be manufactured as a separate element from the moving blade module 30, and may be mounted on the upper part of the moving blade module 30. As the mounting structure, for example, a simple step part 38 may be formed on the upper surface of the housing 31 as shown in FIG. 8(a), and a step part having a corresponding shape may be formed on the bottom surface of the end cover 40. Accordingly, these step parts may be attached and joined to each other.

Figure 8B:
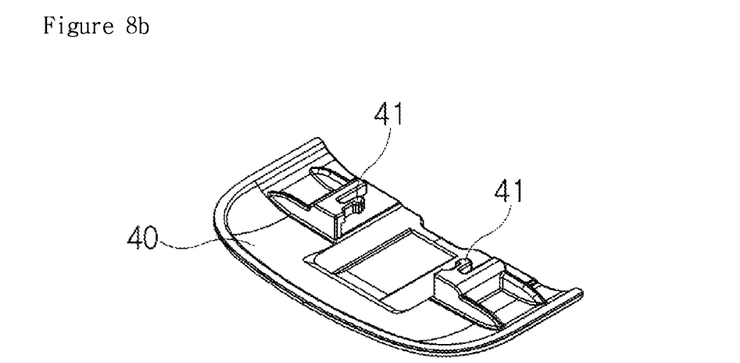

In addition, as shown in FIG. 8(b), an elastic locking projection 41 may be formed on both sides of the bottom of the end cover 40, and a locking groove (not shown) may be formed on the side of the step part 38 of the housing 31 corresponding thereto. Thus, the elastic locking protrusion 41 may be inserted into the locking groove so that the end cover 40 can be mounted on the upper part of the housing 31.

Figure 9A:
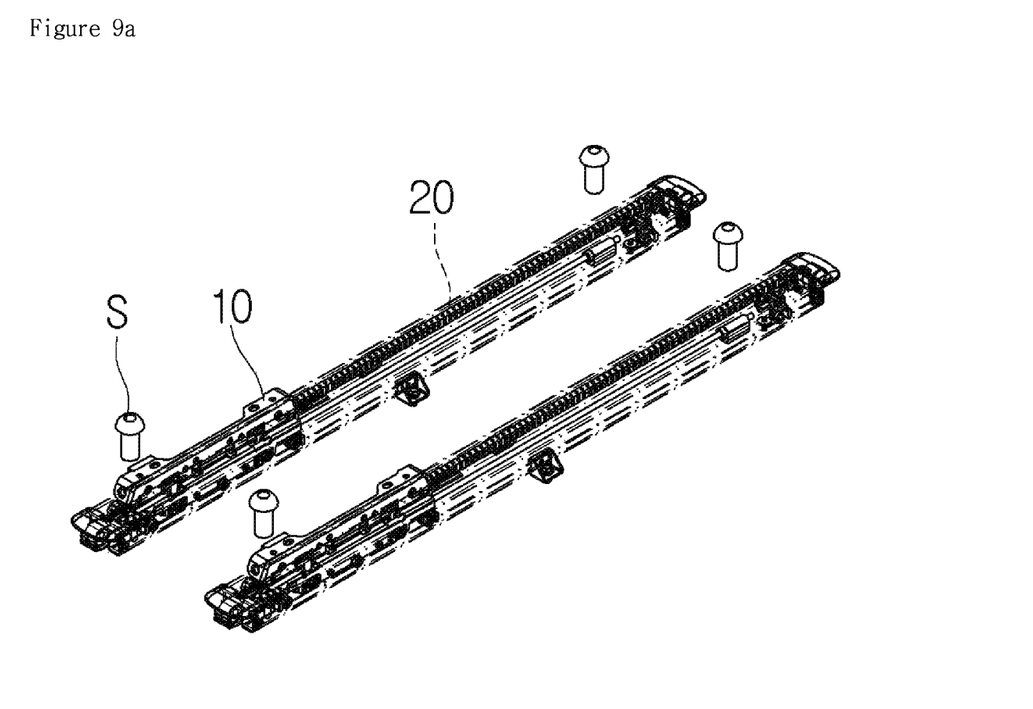
FIGS. 9(a) to (d) are diagrams for explaining a method of assembling a device of a vehicle seat rail for blocking foreign matter, according to the present invention.
Figure 9B:
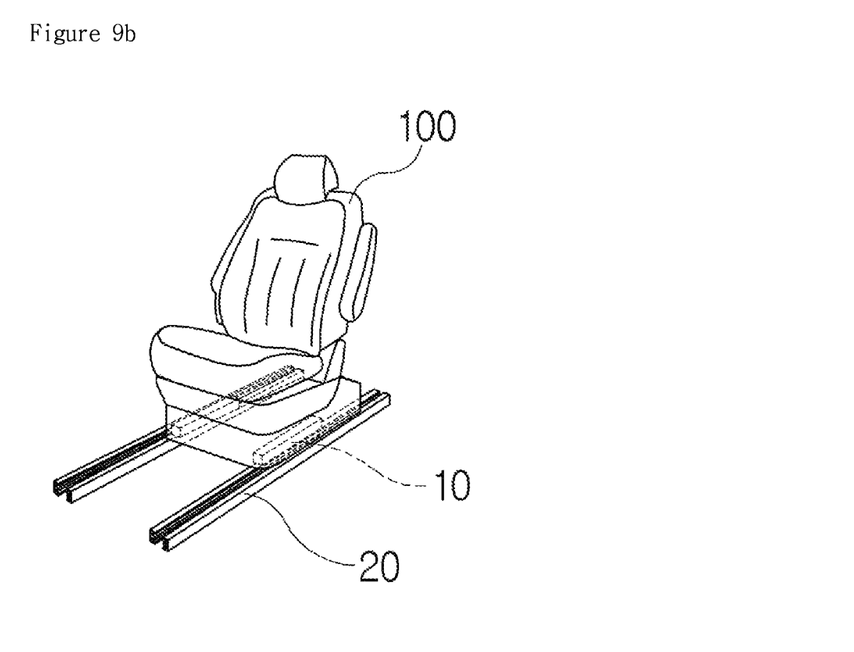
Figure 9C:
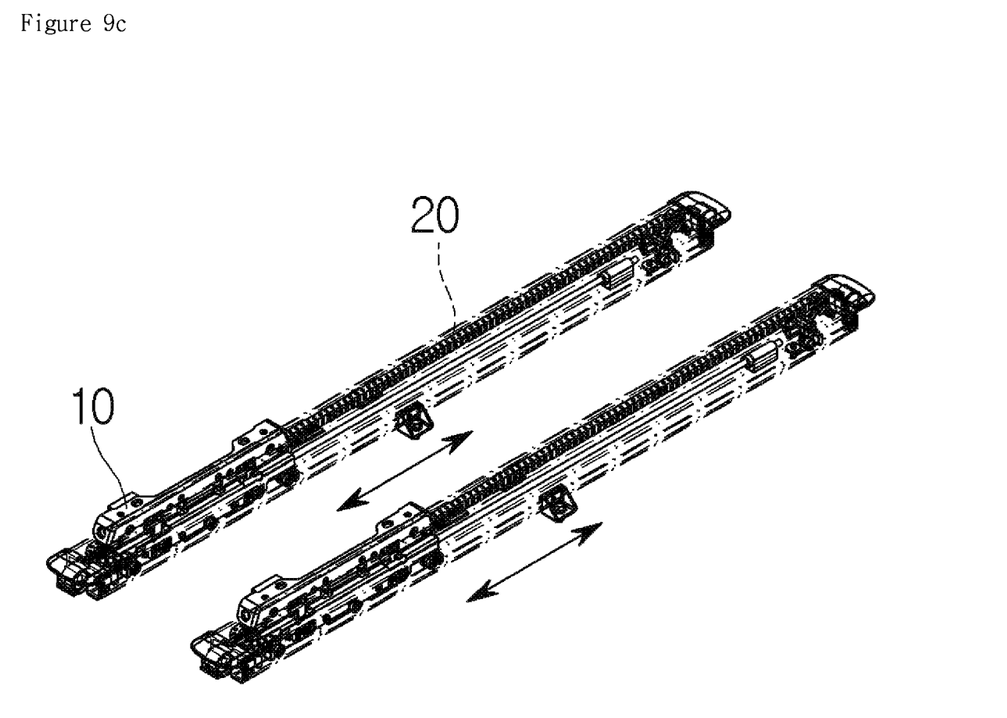
Figure 9D:
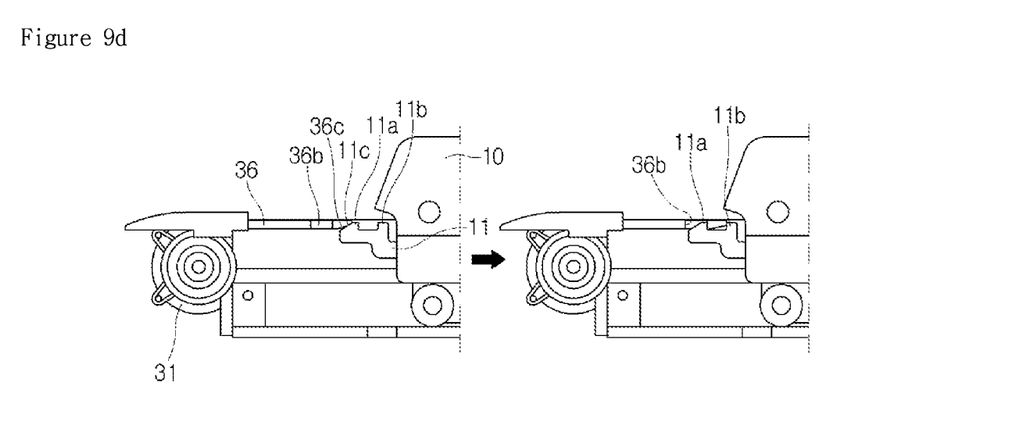

Meanwhile, as shown in FIG. 9(d), a connection member 11 may be provided at both ends of the upper rail 10 for connecting the front end member 36.

The connection member 11 may be provided to protrude in the horizontal direction from the end of the upper rail 10, and the upper end may have the same height as the front end member 36.

A first locking jaw 11a and a second locking jaw 11b may be formed to protrude from the upper end of the connection member 11 at a predetermined interval. The front part of the first locking jaw 11a may be formed with an inclined surface 11c to facilitate coupling with the front end member 36, and correspondingly, the lower end surface of the front end member 36 may be also formed with an inclined surface 36c.

The first locking jaw 11a of the connection member 11 may be inserted into and caught in the connection hole 36b of the front end member 36, so that the front end member 36 and the connection member 11 may be connected. Thus, the moving blade 35 may be connected to the upper rail 10, and thus, the moving blade 35 may be pulled out from the housing 31 of the moving blade module 30 or wound into the moving blade module 30 according to the moving direction of the upper rail 10.

The end of the front end member 36 (a part formed by the inclined surface 36c) may be inserted and seated in the groove between the first and second locking jaws 11a and 11b of the connection member 11. Accordingly, the front end member 36 and the connection member 11 can be solidly connected.

The device of a vehicle seat rail for blocking foreign matter according to the present invention may have the moving blade 35 connected to both ends of the upper rail 10. Each moving blade 35 may be wound around the drum 34 inside the housing 31 of the moving blade module 30 provided at each front and rear end of the lower rail 20. In addition, both ends of the moving blade 35 in the width direction may be inserted into the guide grooves 22 formed in the upper surface part 21 of the lower rail 20 (formed on both sides of the opening hole 23).

Therefore, regardless of the moving position of the upper rail 10, the entire opening hole 23 of the lower rail 20 can be blocked by the moving blade 35 from an outside, so that it is possible to more reliably block foreign matter from entering the interior of the lower rail 20 through the opening hole 23.

Therefore, by preventing foreign matters from being pinched to the rotational shaft of the roller provided in the upper rail 10 or the rolling surface of the roller, the deterioration of the operating performance and operating sensitivity of the rail can be prevented, and the noise occurrence can be prevented during operation.

In addition, the moving blade 35 may be wound around the drum 34 while moving inside/outside of the housing 31 and do not interfere with surrounding elements. Thus, there is no permanent deformation of the moving blade 35, and thus, the permanent deformation cannot be caused due to the appearance quality deterioration such as the deterioration on the wing part 4a of the conventional rail cover 4.

Meanwhile, as shown in FIG. 5, the foreign matter F such as dust falling on the upper surface of the moving blade 35 may move to both ends of the moving blade 35 in the width direction and may flow into the guide groove 22.

The foreign matters F in the guide groove 22 may be removed by the front end member 36. When a seat is moved to the foremost or the rearmost, one of the front end members 36 at the front and rear moves toward the housing 31 of the moving blade module 30. As the front end member 36 moves in this way, the side part 36a on both sides of the front end member 36 pushes the foreign matter F inside the guide groove 22 to move together, and, when the front end member 36 approaches the discharge hole 37 of the housing 31, the foreign matters F pushed by the side part 36a can be discharged to the outside of the lower rail 20 through the discharge hole 37.

As described above, in the present invention, by moving the seat in the front-rear direction as much as possible, even the foreign matter flowing into the guide groove 22 can be neatly removed.

On the other hand, the end cover 40 can be installed on the bottom of a floor at a position outside the range of the seat cushion, and thus, it may be an externally exposed component that is easily visible to the user. Therefore, its design can be frequently changed. In the present invention, since the end cover 40 can be separated from the moving blade module 30 and manufactured as a separate element, the design of the end cover 40 can be changed regardless of the moving blade module 30. Thus, there is an advantage of easy design change.

A method for assembling a device of a vehicle seat rail for blocking foreign matter according to the present invention will be described hereinafter. FIGS. 9(a) and (d) each corresponds to S10 to S40 of FIG. 10.

Figure 10:
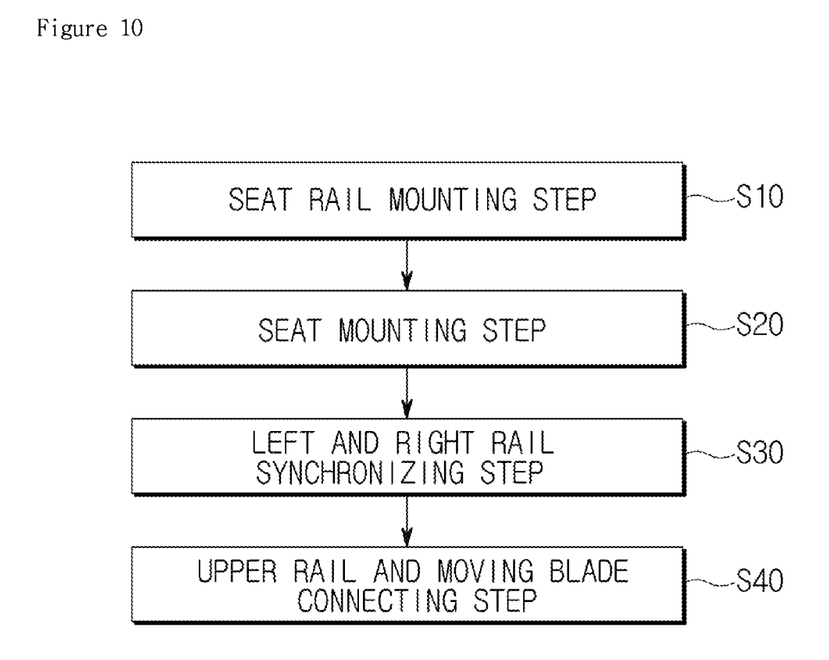
FIG. 10 is a flow chart showing the configuration of a method for assembling a device of a vehicle seat rail for blocking foreign matter, according to the present invention.

The method for assembling a device of the vehicle seat rail for blocking foreign matter according to the present invention may include a seat rail mounting step (S10), a seat mounting step (S20), a left and right rail synchronizing step (S30) and an upper rail and moving blade connecting step (S40).

A seat rail mounting step (S10) includes mounting on a vehicle floor a seat rail (in which the upper rail 10 and lower rail 20 are connected and at both ends the moving blade module 30 and the end cover 40 are installed) as shown in FIG. 9(a). Here, by inserting the screw S through the mounting hole formed in the bottom of the lower rail 20 and fastening the screw S to the screw hole formed on the floor, the lower rail 20 can be installed on the floor. Since the moving blade 35 is not connected to the upper rail 10 and the opening hole 23 of the lower rail 20 is open, the seat rail can be mounted using the screw S as described above.

The seat mounting step (S20) may include mounting the seat 100 to the seat rail installed on the floor by the seat rail mounting step (S10), as shown in FIG. 9(b). The seat 100 may be mounted on the seat rail by fixing the mounting part formed on the cushion frame of the seat 100 to the upper part of the upper rail 10 with a bolt.

The left and right rail synchronizing step (S30) may include making the position of the upper rail 10 at the left and right lower rails 20 as shown in FIG. 9(c). This may be performed manually by an operator, or may be performed automatically by an electronic control unit (ECU) for operating the seat rail.

When the left and right rail synchronizing step (S30) is manually performed, an operator may directly move the upper rail 10 to the front end or the rear end of the lower rail 20 as much as possible to make the positions of both upper rails 10 the same.

Meanwhile, the left and right rail synchronization and virtual limit setting programs (which are conventionally used programs) are input to the electronic control unit, so that the left and right rail synchronizing step (S30) may be automatically performed. When power is supplied to the electronic control unit and the motor provided inside the seat rail, such program is driven and the motor is operated. Accordingly, the upper rail 10 is moved all the way to the front and rear ends of the lower rail 20, and the left and right positions of the upper rail 10 are identically matched (synchronized) with each other, and the position limitation for the front and rear movements of the upper rail 10 are automatically memorized.

While performing the left and right rail synchronizing step (S30) as described above, the upper rail 10 can be moved to the foremost and rearmost of the lower rail 20, at which time the upper rail and moving blade connecting step (S40) can be performed.

When the upper rail 10 moves as far as possible toward the end of the lower rail 20 in either direction, the front end member 36 of the moving blade 35 and the connection member 11 of the upper rail 10 located in the corresponding direction as shown in FIG. 9(d) may meet and make interconnection.

The inclined surface 11c of the connection member 11 in progress may meet the inclined surface 36c of the front end member 36 and proceed while gently lifting the front end member 36, and thereafter, the first locking jaw 11a of the connection member 11 may be inserted into the connection hole 36b of the front end member 36 and be hooked, so that the front end member 36 and the connection member 11 can be connected in the state the connection member 11 can pull the front end member 36. Accordingly, while the moving blade 35 always moves along the upper rail 10, the entire opening hole 23 may be blocked.

As described above, the seat rail mounting step (S10), the seat mounting step (S20), the left and right rail synchronizing step (S30) and the upper rail and moving blade connecting step (S40) may be sequentially carried out according to the assembly method of the present invention. Accordingly, prior to blocking the opening hole 23 with the moving blade 35, it is possible to mount the seat rail on the vehicle floor through the opening hole 23 in an open state.

Thus, in the seat rail itself assembly process prior to the seat rail mounting process, it can remove performing the connection of the connection member 11 of the upper rail 10 and the front end member 36 of the moving blade 35 in advance. Thus, the work efficiency of the seat rail assembly can be improved.

As described above, the present invention has been described with reference to the embodiments shown in the drawings, but this is only exemplary, and those of ordinary skill in the art to which the technology belongs will understand that various modifications and equivalent other embodiments are possible therefrom. Therefore, the true technical protection scope of the present invention should be determined by the following claims.

EXPLANATION OF REFERENCE NUMERAL

| 10: upper rail | 11: connection member |
|---|---|
| 11a: first locking jaw | 11b: second locking jaw |
| 20: lower rail | 21: upper surface |
| 22: guide groove | 23: opening hole |
| 30: moving blade module | 31: housing |

-continued

| 32: mounting part | 32a: insertion end |
|---|---|
| 33: fixed shaft | 34: drum |
| 35: moving blade | 36: front end member |
| 36a: side part | 36b: connection hole |
| 40: end cover | 41: elastic locking projection |

The invention claimed is:

1. A device of a vehicle seat rail for blocking foreign matter, comprising:
    an upper rail on which a seat is mounted;
    a lower rail which is fixed to a floor, the lower rail including an opening hole formed on an upper surface of the lower rail in an entire length direction, and being relatively movably coupled to the upper rail inserted through the opening hole; and
    a moving blade module including a moving blade, the moving blade being provided at both front and rear ends of the lower rail and being connected to both front and rear ends of the upper rail to cover the opening hole,
    wherein the moving blade is configured to be in the shape of a curved surface protruding toward an upper side in the direction of gravity,
    wherein the moving blade module further includes a drum which is located in a cylindrical housing and rotates by a spiral spring, one end of the moving blade being connected to the drum and being wound around the drum, and the other end of the moving blade drawn out of the housing having a front end member, the front end member having a connection hole,
    wherein a connection member having a first locking jaw is provided at the front and rear ends of the upper rail,
    wherein the moving blade is connected to the upper rail by inserting the first locking jaw of the connection member into the connection hole of the front end member and being hooked,
    wherein the lower rail further includes a guide groove formed on both sides of the opening hole in the width direction, and the diameter of the guide groove is gradually narrower as the distance from the opening hole increases, and
    wherein a side part having the same cross sectional shape as the guide groove is formed at both ends of the front end member in the width direction, and the side part is inserted into the guide groove to push and move foreign matter inside the guide groove when moving back and forth.

2. The device of claim 1, wherein a discharge hole is formed in the housing of the moving blade module, and the foreign matter inside the guide groove pushed and moved by the side part of the front end member is discharged to an outside of the seat rail through the discharge hole.

3. The device of claim 1, wherein an end cover is provided at both ends of the lower rail to cover the moving blade module, and the end cover is integrally formed with the housing of the moving blade module.

4. The device of claim 1, wherein an end cover is provided at both ends of the lower rail to cover the moving blade module, and the end cover is manufactured as a separate element from the moving blade module and mounted on an upper surface of the housing of the moving blade module.

* * * * *